(12) United States Patent
Cohen

(10) Patent No.: US 10,866,034 B2
(45) Date of Patent: *Dec. 15, 2020

(54) SUPERCONDUCTING WIRE AND WAVEGUIDES WITH ENHANCED CRITICAL TEMPERATURE, INCORPORATING FRACTAL PLASMONIC SURFACES

(71) Applicant: Fractal Antenna Systems, Inc., Bedford, MA (US)

(72) Inventor: Nathan Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/231,729

(22) Filed: Dec. 24, 2018

(65) Prior Publication Data

US 2019/0204027 A1 Jul. 4, 2019

Related U.S. Application Data

(63) Continuation-in-part of application No. 15/617,683, filed on Jun. 8, 2017, now Pat. No. 10,415,896, which
(Continued)

(51) Int. Cl.
*H01H 47/00* (2006.01)
*F28F 7/00* (2006.01)
(Continued)

(52) U.S. Cl.
CPC ............... *F28F 7/00* (2013.01); *F41H 3/00* (2013.01); *G02B 1/002* (2013.01); *G02B 5/008* (2013.01);
(Continued)

(58) Field of Classification Search
None
See application file for complete search history.

(56) References Cited

U.S. PATENT DOCUMENTS 1,434,167 A 10/1922 Thorner
5,250,950 A 10/1993 Scherrer et al.
(Continued)

FOREIGN PATENT DOCUMENTS

CN 105723079 6/2016
KR 10-2010-0072382 7/2010
(Continued)

OTHER PUBLICATIONS

International Search Report and the Written Opinion from corresponding PCT Application No. PCT/US2013/062940 dated Jan. 23, 2014.
(Continued)

*Primary Examiner* — Stephen W Jackson
(74) *Attorney, Agent, or Firm* — Cesari and McKenna, LLP

(57) ABSTRACT

Systems according to the present disclosure provide one or more surfaces that function as power radiating surfaces for which at least a portion of the radiating surface includes or is composed of "fractal cells" placed sufficiently closed close together to one another so that a surface wave causes near replication of current present in one fractal cell in an adjacent fractal cell. The fractal cells may lie on a flat or curved sheet or layer and be composed in layers for wide bandwidth or multibandwidth transmission. The area of a surface and its number of fractals determines the gain relative to a single fractal cell. The boundary edges of the surface may be terminated resistively so as to not degrade the cell performance at the edges. The fractal plasmonic surfaces can be utilized to facilitate electrical conduction with lower ohmic resistance than would otherwise be possible in the absence of the fractal plasmonic surface(s) at the same temperature.

18 Claims, 8 Drawing Sheets

Related U.S. Application Data is a continuation of application No. 15/296,729, filed on Oct. 18, 2016, now Pat. No. 9,677,824, which is a continuation of application No. 14/043,781, filed on Oct. 1, 2013, now Pat. No. 9,482,474.

(60) Provisional application No. 61/744,651, filed on Oct. 1, 2012, provisional application No. 61/855,380, filed on May 14, 2013, provisional application No. 62/609,678, filed on Dec. 22, 2017.

(51) Int. Cl.

| | | |
|---|---|---|
| *H02J 50/12* | (2016.01) | |
| *G02B 1/00* | (2006.01) | |
| *H02J 50/40* | (2016.01) | |
| *F41H 3/00* | (2006.01) | |
| *H01Q 17/00* | (2006.01) | |
| *G02B 5/00* | (2006.01) | |
| *H01Q 15/00* | (2006.01) | |
| *H01Q 1/36* | (2006.01) | |
| *F25B 23/00* | (2006.01) | |

(52) U.S. Cl.
CPC ........... *H01Q 1/364* (2013.01); *H01Q 15/004* (2013.01); *H01Q 17/008* (2013.01); *H02J 50/12* (2016.02); *H02J 50/40* (2016.02); *F25B 23/003* (2013.01); *F28F 2245/06* (2013.01)

(56) References Cited

U.S. PATENT DOCUMENTS

| | | |
|---|---|---|
| 6,104,349 A | 8/2000 | Cohen |
| 6,127,977 A | 10/2000 | Cohen |
| 6,140,975 A | 10/2000 | Cohen |
| 6,363,268 B1 | 3/2002 | Schuchardt et al. |
| 6,445,352 B1 | 9/2002 | Cohen |
| 6,452,553 B1 | 9/2002 | Cohen |
| 6,476,766 B1 | 11/2002 | Cohen |
| 6,642,881 B1 | 11/2003 | Lawrence et al. |
| 6,876,320 B2 | 4/2005 | Puente Baliarda |
| 6,985,122 B2 | 1/2006 | Cohen |
| 7,019,695 B2 | 3/2006 | Cohen |
| 7,102,814 B1 | 9/2006 | Hughes |
| 7,126,537 B2 | 10/2006 | Cohen |
| 7,145,513 B1 | 12/2006 | Cohen |
| 7,190,318 B2 | 3/2007 | Cohen |
| 7,215,290 B2 | 5/2007 | Cohen |
| 7,256,751 B2 | 8/2007 | Cohen |
| 7,301,493 B1 | 11/2007 | Canales et al. |
| 7,345,642 B2 | 3/2008 | Cohen |
| 7,456,799 B1 | 11/2008 | Cohen |
| 7,994,962 B1 | 8/2011 | Ben-Shmuel |
| 8,067,996 B2 | 11/2011 | Hillman et al. |
| 8,253,639 B2 | 8/2012 | Cohen |
| 8,378,877 B2 | 2/2013 | Tishin et al. |
| 8,610,617 B1 | 12/2013 | Avouris et al. |
| 8,860,607 B2 | 10/2014 | Shamim |
| 8,878,741 B2 | 11/2014 | Mosallaei |
| 8,917,210 B2 | 12/2014 | Dang |
| 8,937,579 B2 | 1/2015 | Cohen |
| 9,134,465 B1 | 9/2015 | Cohen |
| 9,166,302 B2 | 10/2015 | Cohen |
| 9,482,474 B2 | 11/2016 | Cohen |
| 9,638,479 B2 | 5/2017 | Cohen |
| 9,677,824 B2 | 6/2017 | Cohen |
| 9,847,465 B2 | 12/2017 | Cohen |
| 9,935,503 B2 | 4/2018 | Cohen |
| 10,030,917 B1 | 7/2018 | Cohen |
| 10,415,896 B2 * | 9/2019 | Cohen .................... G02B 5/008 |
| 2001/0038325 A1 | 11/2001 | Smith |
| 2007/0028958 A1 | 2/2007 | Retti |
| 2007/0236406 A1 | 10/2007 | Wen |
| 2008/0024792 A1 | 1/2008 | Pendry |
| 2009/0135042 A1 | 5/2009 | Umishita et al. |
| 2009/0207087 A1 | 8/2009 | Fang |
| 2010/0126566 A1 | 5/2010 | Ji |
| 2010/0288116 A1 | 11/2010 | Cincotti |
| 2010/0330348 A1 | 12/2010 | Lenz |
| 2011/0063189 A1 | 3/2011 | Cohen et al. |
| 2013/0208332 A1 | 8/2013 | Yu |
| 2015/0247297 A1 | 9/2015 | Protzmann |

FOREIGN PATENT DOCUMENTS

| | | |
|---|---|---|
| WO | 2011138670 | 11/2011 |
| WO | WO 2011/138670 | 11/2011 |
| WO | WO 2014/05573 | 4/2014 |

OTHER PUBLICATIONS

Veselago, "A Soviet 'Reviews of Modern Physics,'" Seminal Paper in Soviet Physics, USPEKHI, 10:509-514 (1968).

Extended European Search Report for corresponding European Application No. 18194500.7 dated Nov. 14, 2018.

Trinh-Van et al., "A Wideband Circularly Polarized Pixelated Dielectric Resonator Antenna," Sensors, 2016, Publication (online). Aug. 23, 2016 [retrieved Dec. 31, 2018] Retrieved from the internet: <URL: https://www.mdpi.cpm/1424-8220/16/9/1349/htm.; pp. 1-7.

Keyrouz et al., "Dielectric Resonator Antennas: Basic Concepts, Design Guidelines, and Recent Developments at Millimeter-Wave Frequencies," International Journal of Antennas and Propagation, vol. 2016, Publication [online]. Oct. 2009 [retrieved Dec. 31, 2018]. Retrieved from the internet: <URL: https://www.hindawi.com/journals/ijap/2016/6075680/>, pp. 1-21.

International Search Report and the Written Opinion from corresponding PCT Application No. PCT/US2018/061842 dated Jan. 18, 2019.

Martinez Santa, et al. "Fractal Design Approach for Heat Sinks" Contemporary Engineering Sciences, vol. 10, No. 32, Publication, Dec. 19, 2017.

International Search Report and Written Opinion dated Mar. 25, 2019 for International Application No. PCT/US18/67442 filed Dec. 24, 2018 by Fractal Antenna Systems, Inc., 14 pages.

International Preliminary Report on Patentability for PCT/US2018/061842 filed Nov. 19, 2018 for Fractal Antenna Systems, Inc., 4 pages.

International Preliminary Report on Patentability for PCT/US2018/067442 filed Dec. 24, 2018 for Fractal Antenna Systems, Inc., 7 pages.

\* cited by examiner

SUPERCONDUCTING WIRE AND WAVEGUIDES WITH ENHANCED CRITICAL TEMPERATURE, INCORPORATING FRACTAL PLASMONIC SURFACES

CROSS-REFERENCE TO RELATED APPLICATIONS

This application is a continuation-in-part of U.S. patent application Ser. No. 15/617,683 filed Jun. 8, 2017 and entitled "Radiative Transfer and Power Control with Fractal Metamaterial and Plasmonics," which is a continuation of U.S. patent application Ser. No. 15/296,729 filed Oct. 18, 2016 and entitled "Radiative Transfer and Power Control with Fractal Metamaterial and Plasmonics," which is a continuation of U.S. patent application Ser. No. 14/043,781 filed Oct. 1, 2013, which claims priority to U.S. Provisional Patent Application No. 61/744,651 filed Oct. 1, 2012 and entitled "Radiative Transfer and Power Control with Fractal Metamaterials and Plasmonics" and U.S. Provisional Patent Application No. 61/855,380 filed May 14, 2013 and entitled "Radiative Transfer and Power Control with Fractal Metamaterial and Plasmonics"; the entire content of each of which applications is incorporated herein by reference. This application also claims the benefit of and priority to U.S. Provisional Patent Application No. 62/609,678, filed Dec. 22, 2017, and entitled "Superconducting Wire and Waveguides with Enhanced Critical Temperature Incorporating Fractal Plasmonic Surfaces," the entire content of which application is hereby incorporated herein by reference.

BACKGROUND

Effective thermal management is a concern in many industries and for various types of consumer goods. For example, heat build-up in a computer's central processing unit (CPU) can degrade the computer's performance just as heat build-up (or "heat soak") in an automobile's brakes or engine can degrade the automobile's performance. Many machines and devices have performance limits that are often defined by how well heat developed during operation is managed. Such heat build-up is often a byproduct of power transmission and use.

Some common thermal management techniques rely on convective heat transfer. Convective heat transfer, often referred to simply as convection, is the transfer of heat from one place to another by the movement of fluids. Convection is usually the dominant form of heat transfer in liquids and gases. Convection can be "forced" by movement of a fluid by means other than buoyancy forces (for example, a water pump in an automobile engine). For machinery and electronic components, convective cooling is typically employed.

A heat pipe or heat pin is a heat-transfer device that combines the principles of both thermal conductivity and phase transition to efficiently manage the transfer of heat between two solid interfaces. At the hot interface of a heat pipe a liquid in contact with a thermally conductive solid surface turns into a vapor by absorbing heat from that surface. The vapor then travels along the heat pipe to the cold interface and condenses back into a liquid—releasing the latent heat. The liquid then returns to the hot interface through either capillary action or gravity, and the cycle repeats. Consumer electronics such as personal computers often utilized heat pipes for cooling a central processing unit.

Since they rely on fluids as media to transport heat, such convective and heat-pipe cooling techniques can present issues relating to management (e.g., containment and pumping) of the fluids, and may not be appropriate for some applications.

Thermoelectric cooling employs the Peltier effect to create a heat flux between or at the junction of two different types of materials. The Peltier effect is the presence of heating or cooling at an electrified junction of two different conductors and is named for French physicist Jean Charles Athanase Peltier, who discovered it in 1834. When a current is made to flow through a junction between two conductors A and B, heat may be generated (or removed) at the junction. A Peltier cooler, heater, or thermoelectric heat pump is a solid-state active heat pump which transfers heat from one side of the device to the other, with consumption of electrical energy, depending on the direction of the current. Such an instrument is also called a Peltier device, Peltier heat pump, solid state refrigerator, or thermoelectric cooler (TEC). They can be used either for heating or for cooling (refrigeration) although in practice the main application is to cooling. It can also be used as a temperature controller that either heats or cools.

Thermoelectric cooling is reliant on supplied electricity for the cooling effect and consequently may not be desirable for some applications.

SUMMARY

The present disclosure is directed to systems and techniques that provide for desired transfer of radiation by using close packed arrangements of resonators having fractal shapes, i.e., "fractal cells." Systems and techniques according to the present disclosure provide one or more surfaces that act or function as heat or power radiating surfaces for which at least a portion of the radiating surface includes or is composed of metamaterial resonators, which can include fractal cells (small fractal shapes), as antennas or resonators placed sufficiently closed close together to one another (e.g., less than a wavelength such as ¹⁄₂₀ wavelength) so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multi-bandwidth transmission. The area of a surface (e.g., sheet) and its number of fractals determines the gain relative to a single fractal cell. As each cell is fed plasmonicly rather than directly, "dead" or covered or out of resonance cells do not alter the ability of the other cells to work. The boundary edges and/or portions of the area of a surface (on either side) may be terminated resistively (have resistive material(s) applied of included) so as to not degrade the cell performance at the edges. The surfaces may be referred to as fractal plasmonic surfaces (PPS's), when the metamaterials include or are composed of fractal cells, and can provide benefits for thermal management and/or power delivery.

Such a metamaterial, e.g., fractal plasmonic surface (FPS), may be used to transfer radiation, e.g., via evanescent wave transfer. In doing so such surfaces can be used to remove radiative power and/or heat from one location to another, or divert it to another location. Such surfaces may be used to essentially diffuse power delivered to a part of the FPS and dissipate and or distribute it to other specific parts or globally. Heat for example, may be dissipated in this way, or a power "hotspot" supplied or hit with localized power may have the power spread out or diverted to other desired locations, e.g., different areas of a related machine or structure. In some embodiments, a FPS on a closed or curved surface may act as a cloaking device to divert power (in a wavelength or frequency of interest) from one side of the device to the other. In other embodiments, a refrigeration or cooling effect may be induced by transferring heat away from a FPS.

Exemplary embodiments of the present disclosure can provide techniques, including systems and/or methods, for cloaking objects at certain wavelengths/frequencies or over certain wavelength/frequency ranges (bands). Such techniques can provide an effective electromagnetic lens and/or lensing effect for certain wavelengths/frequencies or over certain wavelength/frequency ranges (bands).

In some embodiments, the effects produced by such techniques can include cloaking or so-called invisibility of the object(s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc., may be realized, e.g., by appropriate scaling of dimensions and selection of shape of the resonator elements.

Exemplary embodiments of the present disclosure can include a novel arrangement of resonators in a lattice like configuration. The arrangements can include resonators of several different sizes and/or geometries arranged so that each size or geometry ("grouping") corresponds to a moderate or high quality factor, "Q," (that is moderate or low bandwidth) response that resonates within a specific frequency range.

For exemplary embodiments, fractal resonators can be used for the resonators in such structures because of their control of passbands, and smaller sizes compared to non-fractal based resonators. Their benefit arises from a size standpoint because they can be used to shrink the resonator(s), while control of passbands can reduce or eliminates issues of harmonic passbands that would resonate at frequencies not desired.

Further embodiments of the present disclosure are directed to scatterer or scattering structures. Additional embodiments of the present disclosure are directed to structures/techniques for activating and/or deactivating cloaking structures. Further embodiments of the present disclosure are directed to wideband absorbers.

It should be understood that other embodiments of FPS systems and methods according to the present disclosure will become readily apparent to those skilled in the art from the following detailed description, wherein exemplary embodiments are shown and described by way of illustration. The systems and methods of the present disclosure are capable of other and different embodiments, and details of such are capable of modification in various other respects. Accordingly, the drawings and detailed description are to be regarded as illustrative in nature and not as restrictive. These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps. Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
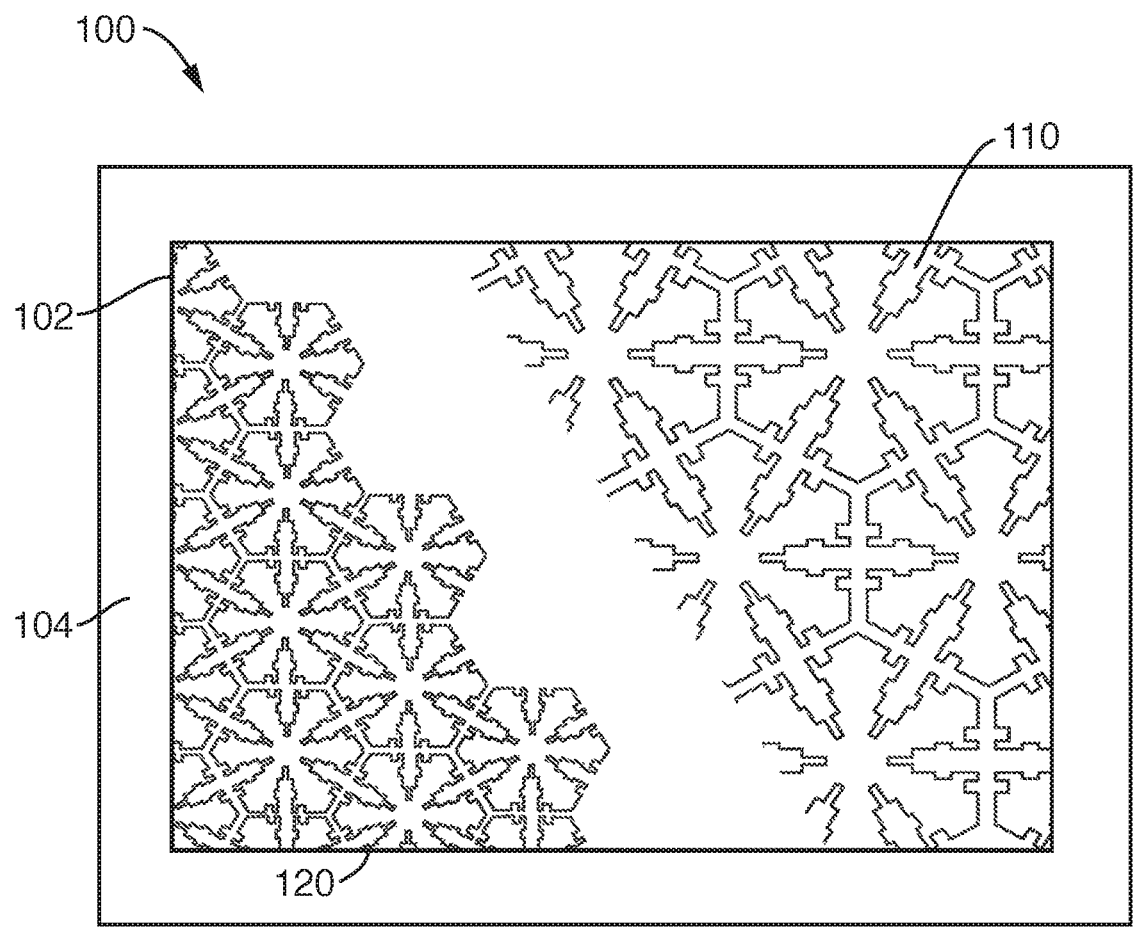
FIG. 1 depicts a diagrammatic plan view of a fractal plasmonic surface (FPS), in accordance with exemplary embodiments of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Systems and techniques according to the present disclosure provide for desired transfer of radiation by using closely-packed arrangements of resonators having fractal shapes, i.e., "fractal cells." Systems and techniques according to the present disclosure provide one or more surfaces that act or function as heat or power radiating surfaces for which at least a portion of the radiating surface includes or is composed of "fractal cells"—small fractal shapes acting as antennas or resonators—placed sufficiently close to one another (e.g., less than 1/20 wavelength) so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multibandwidth transmission. The area of a surface (e.g., sheet) and its number of fractals determines the gain relative to a single fractal cell. As each cell is fed plasmonicly rather than directly, "dead" or covered or out of resonance cells do not alter the ability of the other cells to work. The boundary edges of the surface may be terminated resistively so as to not degrade the cell performance at the edges. These surfaces may be referred to as fractal plasmonic surfaces (FPS's).

Such a fractal plasmonic surface (FPS) may be used to transfer radiation, e.g., via evanescent wave transfer. In doing so such surfaces can be used to remove radiative power and/or heat from one location to another, or divert it to another location. Such surfaces may be used to essentially diffuse power delivered to a part of the FPS and dissipate and or distribute it to other specific parts or globally. Heat for example, may be dissipated in this way, or a power "hotspot" supplied or hit with localized power may have the power spread out or diverted to other desired locations, e.g., different areas of a related machine or structure. In some embodiments, a FPS on a closed or curved surface may act as a cloaking device to divert power in a wavelength or frequency of interest) from one side of the device to the other. In other embodiments, a refrigeration or cooling effect may be induced by transferring heat away from a FPS.

In some embodiments, power control may also be achieved through wideband absorption by placing a resistive sheet at the edge of the fractal cells, creating a layer adjacent to the cells. Impinging electromagnetic radiation will be absorbed and not reflected or scattered. A FPS may be used to wireless couple a device for power transmission by placing the power as electromagnetic radiation on the FPS and then physically placing the (to be) powered device closely to the FPS. A FPS may also work even if some of the cells are damaged or missing as a variety of paths exists to convey the plasmonic transmission, A FPS may also be used to diffuse power away from one location to another or dissipate it so as to decrease "hotspots." Heating and cooling as a wideband speed of light heat-like pipe may also be done with the FPS.

Exemplary embodiments of the present disclosure can provide techniques, including systems and/or methods, for cloaking objects at certain wavelengths/frequencies or over certain wavelength/frequency ranges (bands). Such techniques can provide an effective electromagnetic lens and/or lensing effect for certain wavelengths/frequencies or over certain wavelength/frequency ranges (bands). In some embodiments, the effects produced by such techniques can include cloaking or so-called invisibility of the object (s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc., may be realized, e.g., by appropriate scaling of dimensions and selection of shape of the resonator elements. Other exemplary embodiments may be configured for use within 5G bands and/or automotive communication and/or radar bands. Exemplary embodiments of the present disclosure can include a novel arrangement of resonators in a lattice like configuration. The arrangements can include resonators of several different sizes and/or geometries arranged so that each size or geometry ("grouping") corresponds to a moderate or high quality factor, "Q," (that is, moderate or low bandwidth) response that resonates within a specific frequency range.

Exemplary embodiments of FPS and/or metasurface-based structures may be designed for use at certain frequencies used in automotive radar applications. For example, a FPS according to the present disclosure may be configured for operation at 24 GHz, e.g., as coinciding with so-called short-range radar ("SRR"). At 24 GHz, the operational wavelength is approximately 12.5 mm (or, 0.5 inches), which can be used then to design the size and separation distance used for the FPS or metasurface features. As another example, a FPS structure according to the present disclosure may be configured for operation at 77 GHz or within the range of 76-81 GHz, e.g., as coinciding with SRR, so-called medium-range radar ("MRR"), and/or so-called long-range radar ("LRR"). At 77 GHz, the operational wavelength is approximately 4 mm (or 0.157 inches), which can be used then to design the size and separation distance used for the FPS or metasurface features.

A characteristic dimension of each resonator or cell used for a FPS or metasurface-based (metasurface) structure can be derived from or based on an operational wavelength of incident radiation, e.g., such as that from an automotive radar system (e.g., within the range of wavelengths from about 3 mm to about 13 mm). For example, assuming an operational wavelength of 4 mm (similar to that of a SRR system), a characteristic dimension of a cell within the FPS or metasurface or structure could be 0.5 mm (i.e., $\frac{1}{8}$ of a wavelength, or lambda). Using an operational wavelength of 12.5 mm, a characteristic dimension of a cell within the FPS or metasurface or structure could be 3.125 mm (i.e., $\frac{1}{8}$ of a wavelength, or lambda). Of course, other values can be used for a characteristic dimension (e.g., major or minor axis, diameter, height, etc.) of a cell or resonator vis-á-vis an operational wavelength. For example, a cell or resonator may have a characteristic dimension (e.g., major or minor axis, diameter, height, etc.) on the order of the operational wavelength (or for a range of wavelengths, a wavelength within or at a bound of the range). For further example, a cell or resonator may characteristic dimension of about $\frac{1}{2}$, $\frac{1}{3}$, $\frac{1}{4}$, $\frac{1}{5}$, $\frac{1}{6}$, $\frac{1}{7}$, $\frac{1}{9}$, $\frac{1}{10}$, etc. of the operational wavelength (or for a range of wavelengths, a wavelength within or at a bound of the range). For further example, other values may be used for a characteristic dimension of a cell or resonator of a FPS or metasurface. Metasurfaces can accordingly be designed for operation with particular wavelengths or frequency bands of incident radiation, e.g., LRR, MRR, and/or SRR automotive radar bands.

Cells or resonators of a FPS or metasurface-based structure are preferably separated by a separation distance that is a fraction of an operational wavelength or nominal wavelength of an automotive radar system. Examples of such a separation distance can include, but are not limited to, $\frac{3}{4}$, $\frac{2}{3}$, $\frac{1}{2}$, $\frac{1}{3}$, $\frac{1}{4}$, $\frac{1}{5}$, $\frac{1}{6}$, $\frac{1}{7}$, $\frac{1}{8}$, $\frac{1}{9}$, $\frac{1}{10}$, $\frac{1}{11}$, $\frac{1}{12}$, $\frac{1}{20}$, etc. of the operational wavelength (or for a range of wavelengths, a wavelength within or at a bound of the range). For further example, other values may be used for the separation distance or separation distances of a FPS or metasurface; a distribution of resonators or cells within a FPS or metasurface need not be uniform and can have a non-uniform spatial distribution. Metasurfaces can accordingly be designed for operation with particular wavelengths or frequency bands of incident radiation, e.g., LRR, MRR, and/or SRR automotive radar bands.

For exemplary embodiments, fractal resonators can be used for the resonators in such structures because of their control of passbands, and smaller sizes compared to non-fractal based resonators. Their benefit arises from a size standpoint because they can be used to shrink the resonator(s) while control of passbands can reduce or eliminates issues of harmonic passbands that would resonate at frequencies not desired.

Further embodiments of the present disclosure are directed to scatterer or scattering structures. Additional embodiments of the present disclosure are directed to structures/techniques for activating and/or deactivating cloaking structures.

Related fractal technology is described in the following: (i) U.S. Provisional Patent Application No. 61/163,824, filed 26 Mar. 2009 and entitled "Cloaking Techniques"; (ii) U.S. Provisional Patent Application No. 61/163,837, filed 26 Mar. 2009 and entitled "Scatterer"; (iii) U.S. Provisional Patent Application No. 61/163,913, filed 27 Mar. 2009 and entitled "Cloaking Techniques"; and, (iv) U.S. Provisional Patent Application No. 61/237,360, filed 27 Aug. 2009 and entitled "Switching System for Cloak On Command"; the entire contents of all of which applications are incorporated herein by reference.

For exemplary embodiments, fractal resonators can be used for the resonators because of their control of passbands, and smaller sizes. A main benefit of such resonators arises from a size standpoint because they can be used to shrink the resonator(s), while control of passbands can reduce/mitigate or eliminate issues of harmonic passbands that would resonate at frequencies not desired.

Exemplary embodiments of a resonator system for use at infrared (or nearby) frequencies can be built from belts or loops having fractal cells on one or both sides. These belts or loops can function to slip the infrared (heat) energy around an object located within the belts, so the object is effectively invisible and "see thru" at the infrared frequencies. Belts, or shells (or ribbons or strips), having similar closed-packed arrangements for operation at a first passband can be positioned within a wavelength of one another, e.g., 1/20, 1/16, 1/14, 1/12, 1/10, 1/8, 1/6, 1/5, 1/4, 1/3, 1/2 of lambda, etc.

In cloak embodiments, as described in further detail below, an observer can observe an original image or signal, without it being blocked by the cloaked object. Using no power, the fractal cloak having FPS can replicate the original signal (that is, the signal before blocking) with great fidelity. Exemplary embodiments can function in the infrared region (e.g., ~700 nm to ~1 mm, corresponding to ~430 THz to −300 GHz), providing 3:1 bandwidth; operation within or near such can frequencies can provide other bandwidths as well, such as 1:1 up to 2:1 and up to about 3:1.

FIG. 1 depicts a radiative system 100 having a fractal plasmonic surface (FPS), in accordance with the present disclosure. The FPS 102 includes close packed arrangements of resonators having fractal shapes (e.g., "fractal cells") as denoted by 110 and 120. The FPS 102 may be part of a larger surface or area 104. The individual fractal cells are separated from the adjacent fractal cells but are sufficiently close to one another (e.g., less than 1/20 wavelength) so that a surface (plasmonic) wave causes near replication of current present in one fractal cell in an adjacent fractal cell. While preferred fractal shapes are shown in FIG. 1 as being hexagonal or snowflake-like, any suitable fractal shape (e.g., deterministic) maybe used and such a fractal may have two or more iterations. The fractal cells may lie on a flat or curved sheet or layer and be composed in layers for wide bandwidth or multibandwidth transmission. Each layer holding a FPS can utilize fractal cells of different size and shape that those of another layer.

Examples of suitable fractal shapes (for use for shells and/or a scatting object) can include, but are not limited to, fractal shapes described in one or more of the following patents, owned by the assignee of the present disclosure, the entire contents of all of which are incorporated herein by reference: U.S. Pat. Nos. 6,452,553; 6,104,349; 6,140,975; 7,145,513; 7,256,751; 6,127,977; 6,476,766; 7,019,695; 7,215,290; 6,445,352; 7,126,537; 7,190,318; 6,985,122; 7,345,642; and, 7,456,799.

Other suitable fractal shape for the resonant structures can include any of the following: a Koch fractal, a Minkowski fractal, a Cantor fractal, a torn square fractal, a Mandelbrot, a Caley tree fractal, a monkey's swing fractal, a Sierpinski gasket, and a Julia fractal, a contour set fractal, a Sierpinski triangle fractal, a Menger sponge fractal, a dragon curve fractal, a space-filling curve fractal, a Koch curve fractal, a Lypanov fractal, and a Kleinian group fractal. While exemplary fractal shapes are shown in FIG. 1, the present disclosure is not limited to such and any other suitable fractal shapes (including generator motifs) may be used in accordance with the present disclosure.

The fractal cells 110 and 120 can be formed on the FPS 102 by any suitable techniques. Such techniques can include additive and/or subtractive techniques. Suitable lithography techniques may be used for some embodiments. In exemplary embodiments, the fractal shapes of the fractal cells 110 and 120 can be conductive traces that are deposited on the underlying surface, e.g., a suitable substrate. Any suitable deposition techniques can be utilized. In other embodiments, the fractal cells 110 and 120 can be etched or engraved onto a surface. Any suitable micromachining or nanomachining techniques may be used.

Exemplary embodiments of system 100 can utilize a material for a substrate that has low-loss characteristics in the infrared region to facilitate heat transfer by fractal cells disposed on, disposed in, or supported by the substrate, e.g., on a supporting surface provided by the substrate. Examples of suitable materials for such substrates can include, but are not limited to, the following: chalcogenide-glasses in general; high-purity As—S, As Se, Ge—As—Se glasses; and, $Ge_{30}As_{10}Se_{30}Te_{30}$ glass, and the like.

Figure 2:
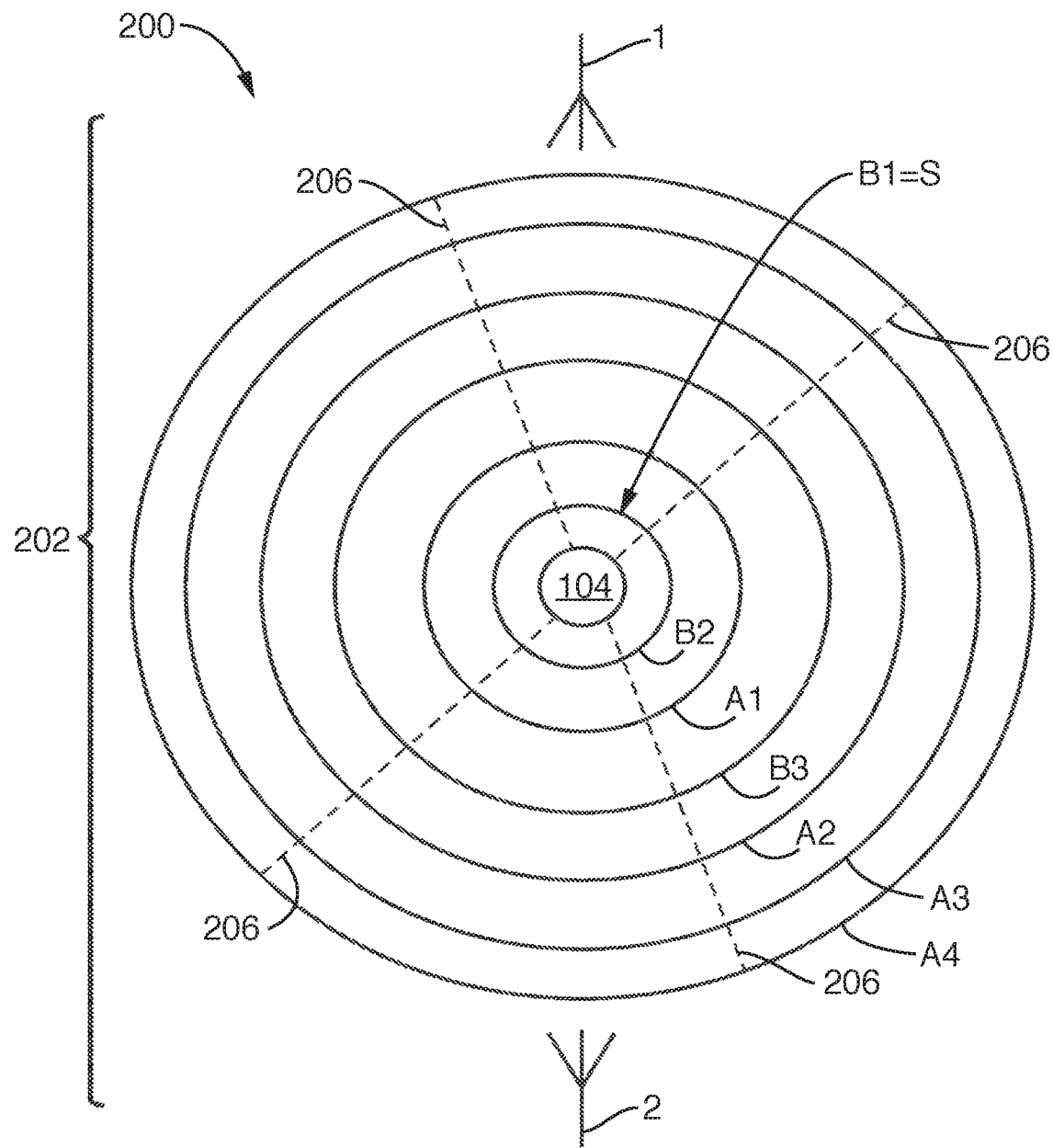
FIG. 2 depicts a diagrammatic plan view of a resonator cloaking system utilizing a number of cylindrical shells, in accordance with exemplary embodiments of the present disclosure.

FIG. 2 depicts a diagrammatic plan view of a cloaking system 200 and RF testing set up in accordance with exemplary embodiments of the present disclosure. As shown in FIG. 2, a number of concentric shells (or bands) 202 are placed on a platform (parallel to the plane of the drawing). The shells include a flexible substrate (e.g., polyimide with or without composite reinforcement) with conductive traces (e.g., copper, silver, etc.) in fractal shapes or outlines. The shells 202 surround an object to be cloaked (shown as 204 in FIG. 1). A transmitting antenna 1 and a receiving antenna 2 are configured at different sides of the system 200, for the purposes of illustration. The shells 202 can be held in place by radial supports 206.

The shells indicated in FIG. 2 are of two types, one set (A1-A4) configured for optimal operation over a first wavelength/frequency range, and another set (B1-B3) configured for optimal operation over a second wavelength/frequency range. (The numbering of the shells is of course arbitrary and can be reordered, e.g., reversed).

For an exemplary embodiment of system 200, the outer set of shells (A1-A4, with A1 being the innermost and A4 the outmost) had a height of about 3 to 4 inches (e.g., 3.5 inches) and the inner set of shells had a height of about 1 inch less (e.g., about 2.5 to 3 inches). The spacing between the shells with a larger fractal shape (A1-A4) was about 2.4 cm while the spacing between shells of smaller fractal generator shapes (B1-B3) was about 2.15 cm (along a radial direction). In a preferred embodiment, shell A4 was placed between shell 132 and B3 as shown. The resonators formed on each shell by the fractal shapes can be configured so as to be closely coupled (e.g., by capacitive and/or evanescent wave coupling) and function to propagate energy by a plasmonic wave.

It will be appreciated that while two types of shells and a given number of shells per set are indicated in FIG. 2, the number of shell types and number of shells for each set can be selected as desired, and may be optimized for different applications, e.g., wavelength/frequency bands, including the optical bands, i.e., infrared, visible, and ultraviolet, as well as X-ray.

Figure 3:
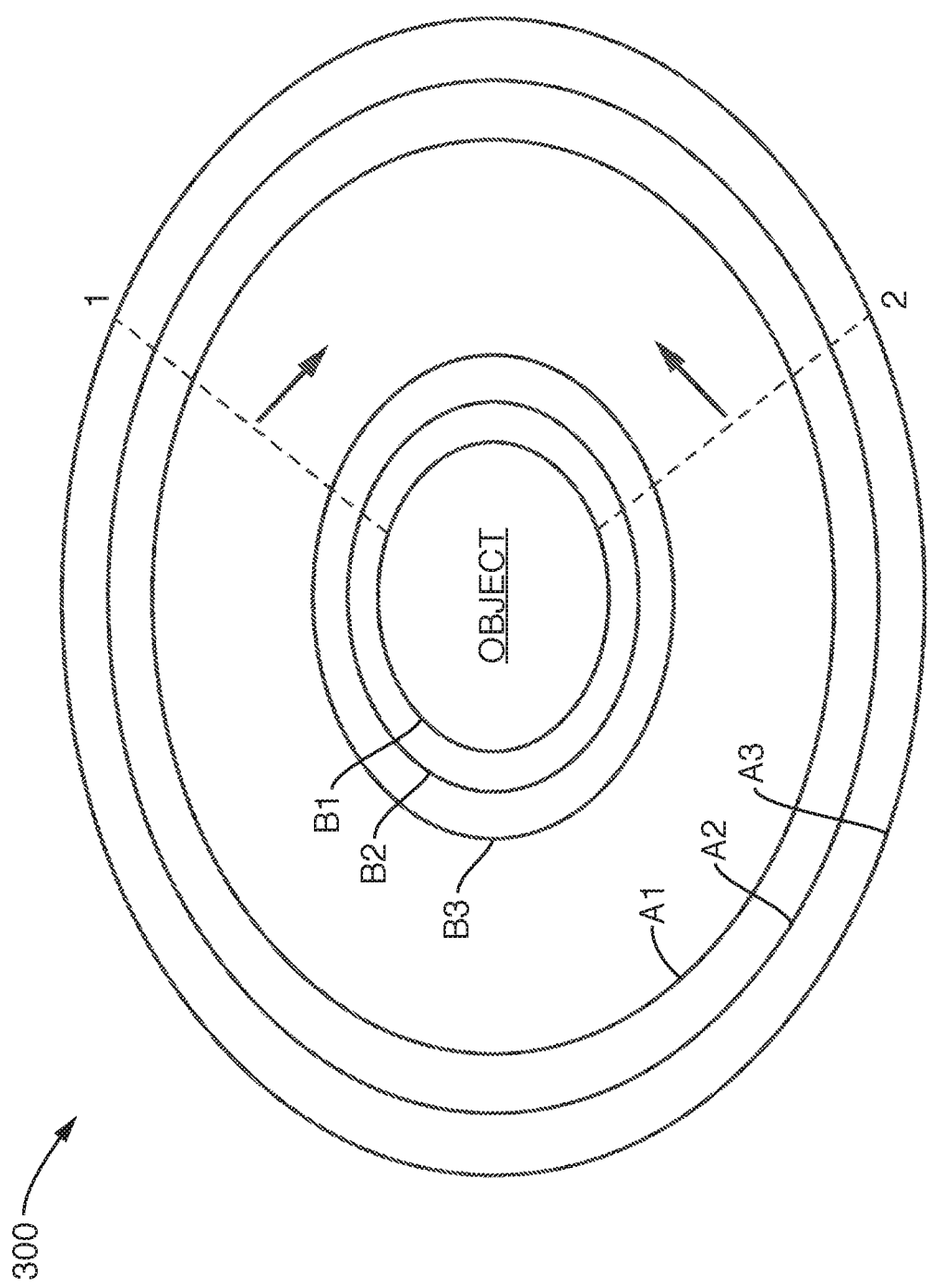
FIG. 3 depicts a diagrammatic plan view of a resonator cloaking system utilizing a number of shells having an elliptical cross-section, in accordance

FIG. 3 depicts a diagrammatic plan view of a cloaking system (or electrical resonator system) according to an alternate embodiment in which the individual shells have an elliptical cross section. As shown in FIG. 3, a system 300 for cloaking can include a number of concentric shells (or bands) 302. These shells can be held in place with respect to one another by suitable fixing means, e.g., they can be placed on a platform (parallel to the plane of the drawing) and/or held with a frame. The shells 302 can include a flexible substrate (e.g., polyimide with or without composite reinforcement) with a close-packed arrangement of electrically conductive material formed on the first surface. As stated previously for FIG. 2, the closed-packed arrangement can include a number of self-similar electrical resonator shapes. The resonator shapes can be made from conductive traces (e.g., copper, silver, gold, silver-based ink, etc.) having a desired shape, e.g., fractal shape, split-ring shape, and the like. The shells 302 can surround an object to be cloaked, as indicated in FIG. 3.

As indicated in FIG. 3 (by dashed lines 1 and 2 and arrows), the various shells themselves do not have to form closed surfaces, Rather, one or more shells can form open surfaces. This can allow for preferential cloaking of the object in one direction or over a given angle (solid angle). Moreover, while dashed lines 1 and 2 are shown intersecting shells B1-B3 and A1-A3 of system 300, one or more shells of each group of shells (B1-B3 and A1-A3) can be closed while others are open. Additionally, it should be appreciated that the cross-sections shown for each shell can represent closed geometric shapes, e.g., spherical and ellipsoidal shells.

As indicated previously, each shell of a cloaking system (e.g., system 300) can include multiple resonators in one or multiple close-packed configurations. The resonators can be repeated patterns of conductive traces. These conductive traces can be closed geometric shapes, e.g., rings, loops, closed fractals, etc. The resonator(s) can be self-similar, e.g., to at least second iteration. The resonators can include split-ring shapes, for some embodiments. The resonant structures are not required to be closed shapes, however, and open shapes can be used for such.

In exemplary embodiments of shell 300, the closed loops can be configured as fractals or fractal-based shapes, e.g., as depicted by fractal cells 110 and 120 in FIG. 1. The dimensions and type of a fractal shape for a fractal cell can be the same for each shell type but can vary between shell types. This variation (e.g., scaling of the same fractal shape) can afford increased bandwidth for the cloaking characteristics of the system. This can lead to periodicity of the fractal shapes of common shell types but aperiodicity between the fractal shapes of different shell types.

It will be appreciated that the resonant structures of the shells may be formed or made by any suitable techniques and with any suitable materials. For example, semiconductors with desired doping levels and dopants may be used as conductive materials. Suitable metals or metal containing compounds may be used. Suitable techniques may be used to place conductors on/in a shell, including, but not limited to, printing techniques, photolithography techniques, etching techniques, and the like.

It will also be appreciated that the shells may be made of any suitable material(s). Printed circuit board materials may be used. Flexible circuit board materials are preferred. Other material may, however, be used for the shells and the shells themselves can be made of non-continuous or discontinuous elements, e.g., a frame or framework. For example, various plastics may be used. In exemplary embodiments, the underlying surface or substrate on which a FPS is formed can have low loss with respect to the type of radiation that the FPS is designed for, so as to facilitate the intended heat and/or power transfer or dissipation.

Exemplary embodiments of the present disclosure can provide techniques, including systems and/or methods, for providing a radar cross section of different sizes than as would otherwise be dictated by the physical geometry of an object. Such techniques (objects/methods) can be useful for implementations such as radar decoys where a given object (decoy) is made to appear in radar cross section as like another object (e.g., missile). Representative frequencies of operation can include those over a range of 500 MHz to 1.3 GHz, though others may of course be realized. Other frequencies, include those of visible light may be realized, e.g., by appropriate scaling of dimensions and selection of shape of fractal elements.

Figure 4A:
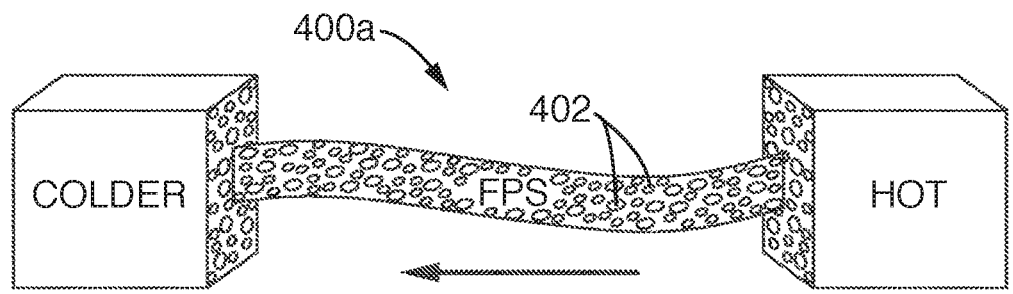
FIGS. 4A, 4B, and 4C depict an example of a FPS in three different configurations, shown in views (A)-(C)
Figure 4B:
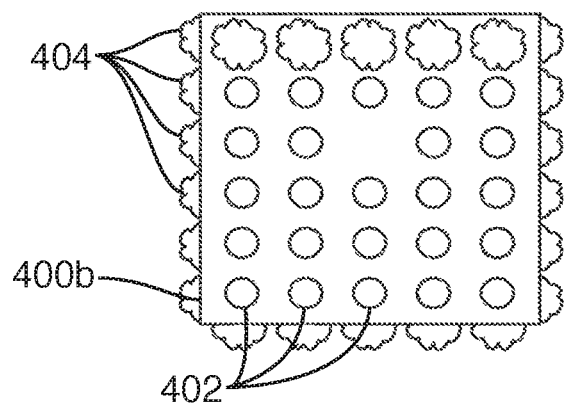
Figure 4C:
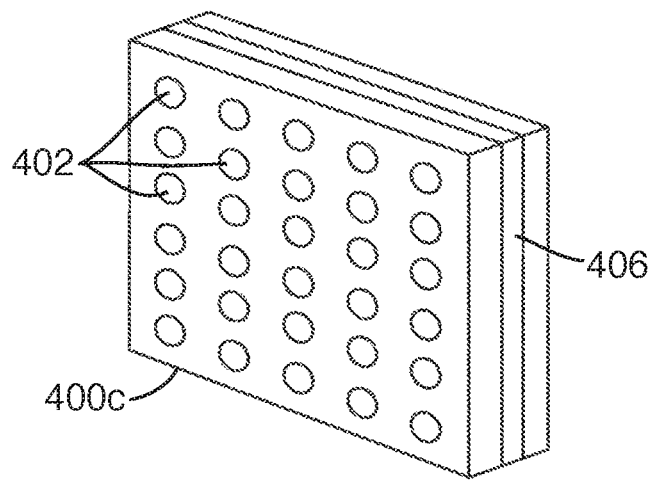

FIG. 4 depicts an example of a FPS 400 in three different configurations, shown in views (A)-(C). In view (A), the FPS 400A is shown physically coupled between two objects, a hot object and a colder object. Heat, in the form of radiative infrared energy, flows from the hot object to the colder object via plasmonic coupling between fractal cells 402 of the FPS 400A.

In view (B), a configuration of FPS 400B is shown having resistive ends 404 in addition to the fractal cells 402. The resistive ends 404 may be made of any suitable resistive material and my any suitable techniques. Such resistive ends may be useful for power dissipation in some applications. View (C) of FIG. 4 shows another embodiment of FPS 400C that has a resistive layer or edge 406 instead of the resistive ends 404 shown previously (though both such resistive elements may be used for a single FPS). Resistive edge 406 may include a layer abutting a surface of FPS 400C or it may include or be connected to a resistive structure that abuts or surrounds FPS 400C on one or more sides, e.g., a perimeter structure disposed around 4 sides of FPS 400C.

Figure 5:
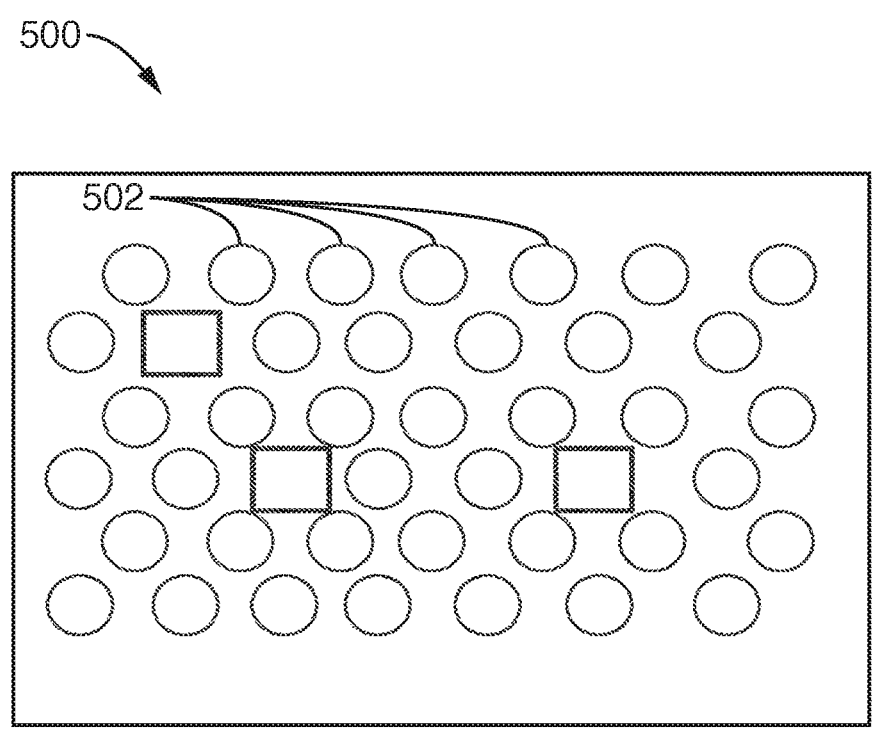
FIG. 5 illustrates the robustness or anti-fragility presented by a FPS under conditions where some fractal cells are damaged or otherwise inoperative.

FIG. 5 illustrates the robustness or anti-fragility presented by a FPS 500 under conditions where some fractal cells are damaged or otherwise inoperative. As show, FPS 500 has a close-packed arrangement of fractal cells, indicated by circles 502. The close-packed arrangement provides many paths by which energy may be transferred from one area of the FPS to another, even in the presence of damaged or otherwise inoperative fractal cells (represented by the black squares shown).

Figure 6:
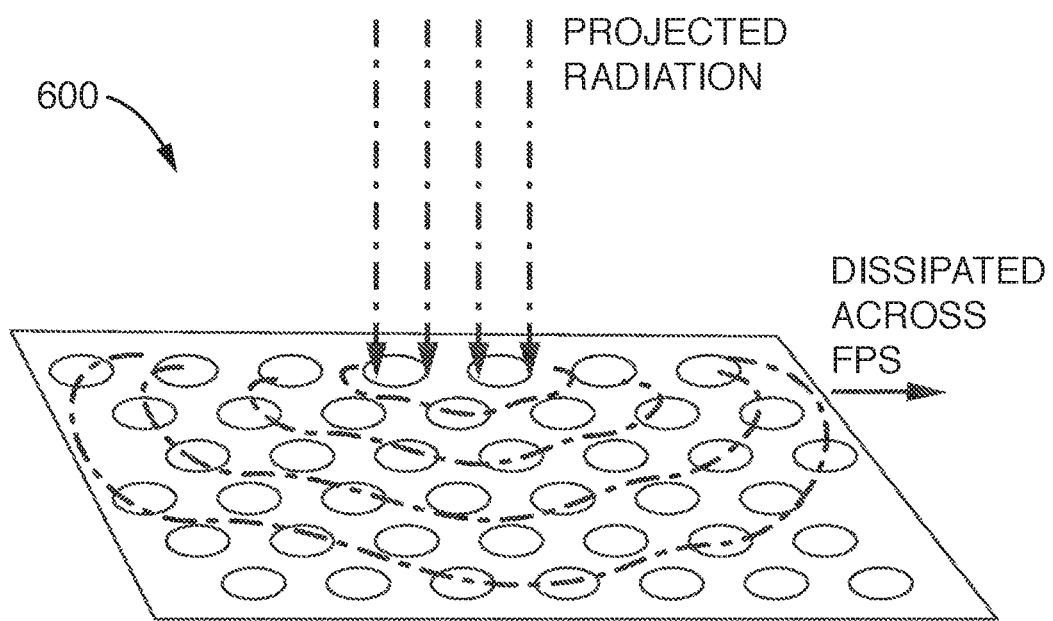
FIG. 6 depicts an example of a FPS used to dissipate incident radiation.

FIG. 6 depicts an example of a FPS 600 used to dissipate incident radiation, which may be directed radiation of high intensity or fluence(s). As shown, radiation that is incident on a localized area of the FPS 600 is dissipated (indicated by concentric rings) across the surface of the FPS 600 via plasmonic coupling and radiative transfer between the fractal cells 602 of the FPS 600.

Exemplary Embodiments: High-Temperature Low-Resistance FPS

As fractal plasmonic surfaces (FPS) propagate electromagnetic waves through evanescent transmission (or, plasmonic-wave transfer), exemplary embodiments of the present disclosure may be utilized for low-electrical-resistance applications, including for so-called superconductors, including but not limited to high-temperature superconductors. Such low-resistance and/or superconductor embodiments are composed of an FPS for at least a portion of the embodiment (e.g., structure or surface). As noted above, fractals are geometric figures in which at least part of the shape exhibits self-similarity on a minimum of two size scales. For convenience, a one size scale shape may also be referred to as "fractal" as well. As noted previously, fractal plasmonic surfaces (FPS) are close-spaced arrays of fractal (or fractal-like) resonators in which evanescent surface waves exhibit electromagnetic radiative transfer. It will be appreciated that "wire" here is a generic term for a wave and or/electron conveyance (e.g., waveguide), which may or may not be continuous, and at zero frequency, said wave can be considered as direct-current or "DC." Fractals according to the present disclosure can be deterministic or non-deterministic. Some embodiments can include both deterministic and non-deterministic features (e.g., patterns on an underlying surface).

The ohmic resistance of the surface decreases rapidly as the temperature of the FPS approaches super-cooled regimes such as that of liquid nitrogen and ultimately approaching absolute zero. The temperature at which a superconductor's electrical resistance drops to zero resistance is called the critical temperature. For FPS structures according to the present disclosure, this electrical effect is presented at higher temperatures than compared to a similar surface made out of a continuous conductor, e.g., at a temperature that is higher than the critical temperature of a conventional material, such as copper. Hence the geometry of the FPS, through and including its collection of fractal cells, produces a cost-effective alternative to conventional materials, and exotic compositions of material used previously for high temperature superconductors. It will be noted that this "FPS superconductor" property of comparative lower respective resistance at lower temperatures occurs over a range of electromagnetic wavelengths determined by the geometry of the cells of the FPS, here composed of fractals. This range may be manifest in multiple wavelength bands and/or at a continuous portion of wavelength spectrum determined by the resonant or near resonant conditions invoked or imparted by the fractal structure or structures.

Superconductors connote electrically-conductive structures whose aggregate resistance decreases upon substantial cooling, e.g., to temperatures approaching absolute zero. The phenomenon usually requires going to temperatures of liquid helium in order to manifest and benefit from the effect. The prior art is hampered by the inability to have a practical solution where such superconductivity effects occur at higher temperatures, for example approaching that of the temperature of liquid nitrogen. Superconductivity at even higher temperatures is, of course, a dramatic practical benefit, which may be facilitated with or realized by embodiments of the present disclosure. The prior art does not describe or suggest a technological and non-natural system capable of fractal-based high temperature superconductivity across an area or length of a FPS. Embodiments of an FPS according to the present disclosure manifest fractal shape cells, providing evanescent wave propagation, functioning as high-temperature superconductors or high-temperature lowered-resistance structures and surfaces.

An exemplary embodiment presents a strip of FPS material, analogous to a wire length of continuous conductor. Instead or a wire, however, the wire is replaced by a series of closely-spaced fractal resonators (fractal cells), which may be cooled by immersion in a cooler liquid or gas so that the superconductivity is manifest. At these cooler temperatures, the ohmic resistance will be substantially reduced from what is normally seen at room temperature; further, a decrease in its ohmic resistance will occur at temperatures that are higher than would otherwise be seen in an analogous conventional superconductor. It will be appreciated that other embodiments are also possible, including such a FPS-based superconductor that may work at temperatures above room temperature. It will also be appreciated that such FPS superconducting surfaces may be curved, expressed on an area, and or manifest on a volume through one or more layers of FPS.

In exemplary embodiments, such an FPS superconductor or lowered-resistance structure/surface can be realized over a range of or at multiple resonant bands, for alternating electromagnetic currents. Examples of such systems include, but are not limited to: antennas incorporating superconducting FPS; motors and or generators incorporating superconducting FPS; wire-like structures and or waveguides incorporating superconducting FPS; inductors and or capacitors and or tuned circuits incorporating superconducting FPS; and, power conveyance structures incorporating superconducting FPS; as well as other embodiments.

Accordingly, embodiments of the present disclosure—by presenting systems of "high-temperature superconductors" incorporating fractal plasmonic surfaces—can and do provide novel system for superconducting (resistance approaching and/or at zero ohms) wires and/or waveguides such that the critical temperature is higher than that normally expected based on the composition of conductive structure (e.g., metallic wire) alone. Such systems may be embodied or used as a means to convey electrical power or electromagnetic power across a length of a surface or manifold (e.g., a wire) or a more substantial topology; thus, embodiments of the present disclosure may be generally employed as a waveguide.

Exemplary embodiments of the present disclosure can incorporate and utilize cooling to below the critical temperature of a conductive material used so as to exhibit superconductivity, for example cooling by surrounding in liquid nitrogen.

Superconductivity refers to a regime in temperature, e.g., below 30 degrees Kelvin, where the resistance of the wire or topology goes to or approaches zero and experiences a discontinuity of resistance value compared to a trend line of resistance at higher temperatures. Suitable cryogenic cooling systems known in the art can be used for such cooling.

Although not essential for the enablement of embodiments of the present disclosure, it is believed that the fractals produce a deep and multiple "potential well" in which electrons or electron pairs are less impeded by thermally related forces that may produce electrical and electronic resistance. This may allow the FPS structure(s) or surface(s) (e.g., linear "FPS wire" or "FPS waveguide") to exhibit zero or near zero resistance at a high "critical temperature," e.g., above the temperature of liquid nitrogen, and in some embodiments, at room temperature. Below the critical temperature the superconductive effect is manifest.

Figure 7:
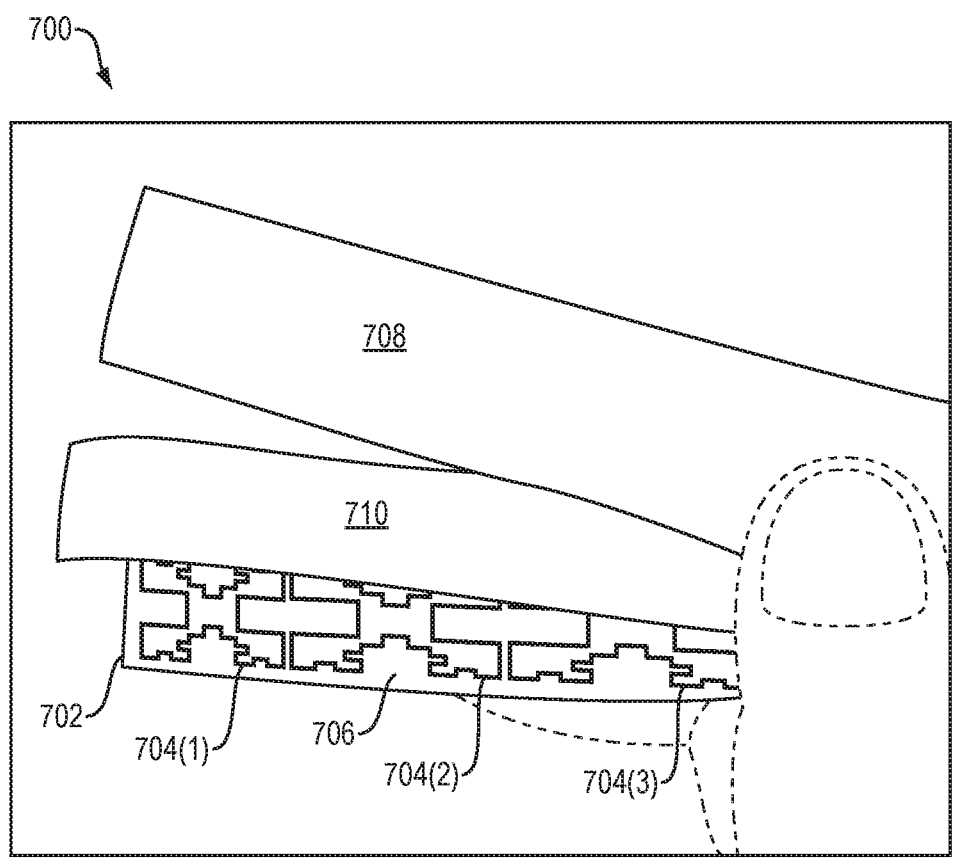
FIG. 7 depicts an exemplary embodiment of a low-resistance or superconductive FPS in accordance with the present disclosure.

FIG. 7 depicts an exemplary embodiment of a low-resistance or superconductive FPS 700 in accordance with the present disclosure. As shown, high-temperature FPS 700 includes a FPS 702, a continuous line or strip of conductive material 708, and a dielectric layer 710 separating the fractal plasmonic surface 702 from the conductive material 708. The FPS 702 includes or is composed of multiple fractalized resonant cells 704. The resonant cells 704 may be defined by conductive material(s) disposed on dielectric material or layer, e.g., 706, 710 or other structure. Of course, in alternate embodiments, the resonant cells may be defined by non-conductive areas relative to conductive area(s)/structure(s), e.g., a slot formed in conductive material. In the drawing, resonant cells 704 are referred to individually as, e.g., 704(1)-(704)(N), and in the plurality as 704. The resonant cells 704 can be configured as a fractal shape, e.g., conductive loops, or slots within the dielectric layer on the opposing side of the dielectric (rather than the side of the dielectric adjacent to the continuous line of conductive material 708. Such loops or slots can be placed next to each other, e.g., within a fraction of a wavelength of radiation of operation, so as to produce an evanescent surface wave at one or more electromagnetic passbands (e.g., which can be defined by conventional terms such as $\frac{1}{2}$ power or $-3$ dB shoulder, etc.). The loops or slots act as fractal "cells" of a fractal plasmonic surface and are closely spaced electrically. The shapes of the resonators 704 shown may be scaled, e.g., to smaller size, by use of suitable techniques, such as lithography techniques or optical lenses for forming suitably small patterns on suitable substrates or materials. Any suitable materials may be used for the dieletric layer 710 (or, substrate), e.g., polyimide, polyamide, FR4, etc. Any suitable material may be used for conductive material used for a resonator, e.g., copper, silver-containing paint, semiconductor(s), conductive plastics, etc. In exemplary embodiments, the resonators 704 may be positioned within $\frac{1}{10}$, $\frac{1}{12}$, $\frac{1}{16}$, or $\frac{1}{20}$ of an operational wavelength, e.g., a longest or selected wavelength of operation; other separation distances may be employed. Further the separation distances need not be uniform between all of the resonators, e.g., in all directions, etc. Additionally, the sizes of the resonators need not all be the same; they may be scaled and/or modified across a FPS, e.g., 700. For a given temperature, e.g., above the critical temperature of the conductive material 708, the FPS 700 has a lower ohmic resistance than that of a strip of solid conductor of the same material as conductive material 708; this is due to the fractal configuration of the FPS 700.

As described above, low-resistance FPS 700 may be employed with suitable cooling means, e.g., a cryogenic cooling system (not shown). By use of such cooling means, the ambient temperature may be reduced to a desired temperature, e.g., that of liquid nitrogen.

The critical temperature of low-resistance FPS 700 is higher than that of a sheet or strip of continuous conductor configured the same as conductive material 708. For example, FPS 700 may have a critical temperature five to fifty degrees Celsius higher than the conductive material 708, e.g., copper.

Figure 8:
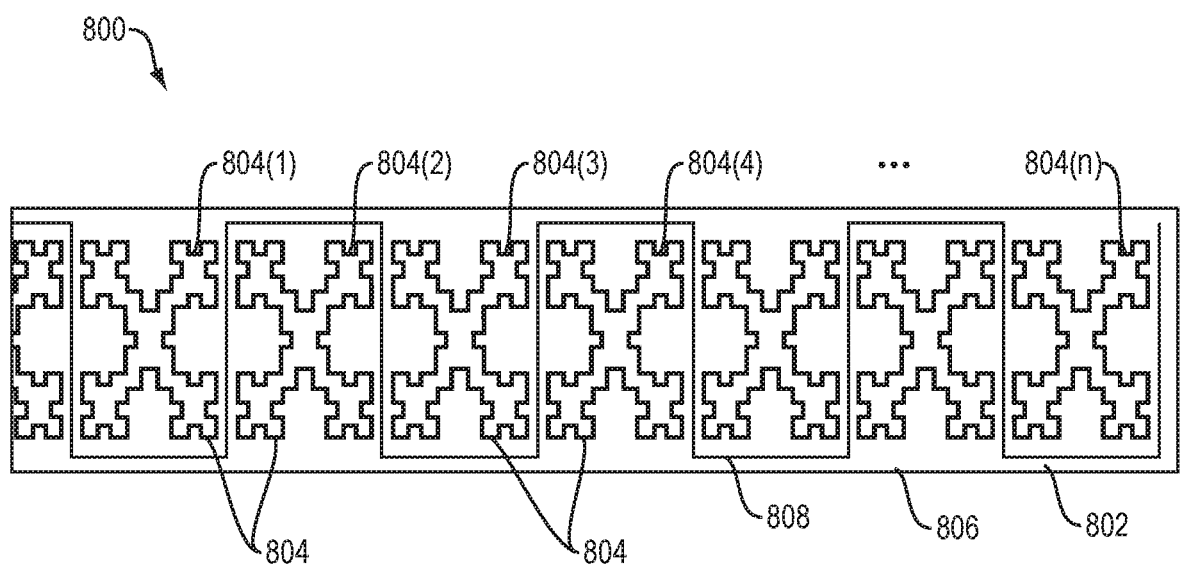
FIG. 8 depicts another exemplary embodiment of a low-resistance or superconductive FPS in accordance with the present disclosure.

FIG. 8 depicts another exemplary embodiment of a high-temperature low-resistance or superconductive FPS 800 in accordance with the present disclosure. As shown, low-resistance FPS 800 includes a FPS 802 having a plurality of fractal cells 804 disposed on a substrate 806. Also present is a meander line 808 of a continuous line of conductive (e.g., copper) material in which the meander separation is filled or occupied by a dielectric and cells 804 (e.g., fractalized conductive loops or slots). As described above, low-resistance FPS 800 may be employed with suitable cooling means, e.g., a cryogenic cooling system (not shown).

One of skill in the art will appreciate that other FPS described herein, e.g., for FIGS. 1-6, may be utilized for low-resistance applications and embodiments.

One skilled in the art will appreciate that while embodiments are shown and described herein as having shells in the shape of concentric rings (circular cylinders), shells can take other shapes in other embodiments. For example, one or more shells could have a generally spherical shape (with minor deviations for structural support). In an exemplary embodiment, the shells could form a nested arrangement of such spherical shapes, around an object to be shielded (at the targeted/selected frequencies/wavelengths). Shell cross-sections of angular shapes, e.g., triangular, hexagonal, while not preferred, may be used. While FPS are described herein, e.g., for FIGS. 7-8, in the context of having fractal resonators, non-fractal resonators may be used within the scope of the present disclosure; such structures may be referred to as metamaterial surfaces.

One skilled in the art will appreciate that embodiments and/or portions of embodiments of the present disclosure can be implemented in/with computer-readable storage media (e.g., hardware, software, firmware, or any combinations of such), and can be distributed and/or practiced over one or more networks. Steps or operations (or portions of such) as described herein, including processing functions to derive, learn, or calculate formula and/or mathematical models utilized and/or produced by the embodiments of the present disclosure, can be processed by one or more suitable processors, e.g., central processing units ("CPUs") implementing suitable code/instructions in any suitable language (machine dependent or machine independent).

While certain embodiments and/or aspects have been described herein, it will be understood by one skilled in the art that the methods, systems, and apparatus of the present disclosure may be embodied in other specific forms without departing from the spirit thereof.

For example, while certain wavelengths/frequencies of operation have been described, these are merely representative and other wavelength/frequencies may be utilized or achieved within the scope of the present disclosure.

Furthermore, while certain preferred fractal generator shapes have been described others may be used within the scope of the present disclosure. Accordingly, the embodiments described herein are to be considered in all respects as illustrative of the present disclosure and not restrictive.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A plasmonically-coupled resonator system, the system comprising:
   a plurality of close-packed fractal cells disposed on a supporting surface, wherein each fractal cell includes a fractal shape defining an electrical resonator, and wherein the plurality of fractal cells are positioned sufficiently close to one another to support plasmonic transfer of energy between the fractal cells; and
   wherein, for a given temperature, the plasmonically-coupled resonator system supports lower ohmic resistance than a respective surface composed of a continuous conductor.

2. The system of claim 1, wherein the supporting surface is part of a substrate, and wherein the substrate comprises a low-loss material in the infrared region.

3. The system of claim 2, wherein the substrate comprises chalcogenide glass.

4. The system of claim 1, wherein the fractal shape comprises a conductive trace.

5. The system of claim 1, wherein the fractal shape comprises a slot, and wherein each resonator forms a slot antenna.

6. The system of claim 1, wherein the fractal shape is selected from the group consisting of a Koch fractal, a Minkowski fractal, a Cantor fractal, a torn square fractal, a Caley tree fractal, a monkey's swing fractal, a Sierpinski gasket, and a Julia fractal.

7. The system of claim 1, wherein the fractal shape is selected from the group consisting of a contour set fractal, a Sierpinski triangle fractal, a Menger sponge fractal, a dragon curve fractal, a space-filling curve fractal, a Koch curve fractal, an Lypanov fractal, and a Kleinian group fractal.

8. The system of claim 1, wherein the fractal cells are separated by about $\frac{1}{20}\lambda$.

9. The system of claim 8, wherein $\lambda$ is in the visible spectrum.

10. The system of claim 8, wherein $\lambda$ is in the infrared spectrum.

11. The system of claim 8, wherein $\lambda$ is in the ultraviolet spectrum.

12. The system of claim 8, wherein $\lambda$ is in the RF spectrum corresponding to a RF frequency range.

13. The system of claim 1, wherein the plurality of fractal cells are configured as a fractal plasmonic surface (FPS), wherein the FPS is operative to transfer heat from one location on the FPS to another desired location on the FPS.

14. The system of claim 1, wherein the plurality of fractal cells are configured as a fractal plasmonic surface (FPS), wherein the FPS is operative to transfer power from one location on the FPS to another desired location on the FPS.

15. The system of claim 1, wherein the plurality of fractal cells are configured as a fractal plasmonic surface (FPS), wherein the FPS is operative to dissipate heat from one location on the FPS across the surface area of the FPS.

16. The system of claim 1, wherein the plurality of fractal cells are configured as a fractal plasmonic surface (FPS), wherein the FPS is operative to dissipate power from one location on the FPS across the surface area of the FPS.

17. The system of claim 1, wherein the support surface comprises chalcogenide glass.

18. A plasmonically-coupled resonator system, the system comprising: a plurality of concentric shells, each shell including a substrate having first and second surfaces and a plurality of close-packed fractal cells disposed on a supporting surface, wherein each fractal cell includes a fractal shape defining an electrical resonator, and wherein the plurality of fractal cells are positioned sufficiently close to one another to support plasmonic transfer of energy between the fractal cells; and wherein, for a given temperature, the plasmonically-coupled resonator system supports lower ohmic resistance than a respective surface composed of a continuous conductor.

* * * * *